(12) United States Patent
Kawakami et al.

(10) Patent No.: US 6,955,347 B2
(45) Date of Patent: Oct. 18, 2005

(54) WORK PALLET POSITIONING AND FIXING DEVICE

(75) Inventors: Takayuki Kawakami, Itami (JP); Ichiro Kitaura, Itami (JP); Seiji Kimura, Itami (JP); Takayuki Kuroda, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 106 days.

(21) Appl. No.: 10/481,736

(22) PCT Filed: Jul. 23, 2002

(86) PCT No.: PCT/JP02/07415

§ 371 (c)(1),
(2), (4) Date: Jan. 15, 2004

(87) PCT Pub. No.: WO03/009964

PCT Pub. Date: Feb. 6, 2003

(65) Prior Publication Data

US 2004/0113346 A1    Jun. 17, 2004

(30) Foreign Application Priority Data

Jul. 24, 2001 (JP) .............................. 2001-223490

(51) Int. Cl.[7] .............................................. B23Q 1/08
(52) U.S. Cl. ...................................................... 269/309
(58) Field of Search ................................ 269/309, 310, 269/56, 900; 29/559, 563, 969, 33 P, 271; 38/180 R; 198/345

(56) References Cited

U.S. PATENT DOCUMENTS 6,641,128 B2 * 11/2003 Fries .......................... 269/309
6,799,758 B2 * 10/2004 Fries .......................... 269/309

FOREIGN PATENT DOCUMENTS

| JP | 8-155770 | 6/1996 |
| JP | 9-38837 | 2/1997 |
| JP | 11-28631 | 2/1999 |
| JP | 2000-117572 | 4/2000 |
| JP | 2001-38564 | 2/2001 |

* cited by examiner

Primary Examiner—Robert C. Watson
(74) Attorney, Agent, or Firm—Jordan and Hamburg LLP

(57) ABSTRACT

The present invention presents a work pallet positioning and fixing device capable of positioning in both horizontal and vertical directions through elastic deformation of an annular engaging portion, wherein the engaging portion can elastically deform along the entire periphery and even locally in a circumferential direction thereof.

5 Claims, 7 Drawing Sheets

WORK PALLET POSITIONING AND FIXING DEVICE

TECHNICAL FIELD

The present invention relates to a positioning and fixing device for a work pallet for fixing a workpiece to be machined, and more particularly, to a device capable of positioning the work pallet accurately in directions vertical and horizontal to a base body.

BACKGROUND ART

In a machine tool such as a machining center, a work pallet supporting a workpiece thereon is usually positioned on a table when the workpiece is machined. In this case, the work pallet is carried to a close position above a base body fixed on the table or a base body as the table itself, and is positioned about the base body before machining the workpiece fixed on the work pallet. In the case of machining various parts for a precision machine, the machining accuracy of about 1 μm is sometimes required, and the workpiece machining accuracy is affected by errors in positioning the work pallet on the base body, and therefore, it is very important to assure the accuracy of positioning the work pallet on the base body.

For example, in a work pallet positioning and fixing device disclosed in Japanese Laid-open Publication No.2001-38564, a tapered collet is externally slidably fitted on a sleeve shaft formed at a base body, and the tapered collet is energized upward by a spring member, and at the upper end of base body formed is a receiving surface for vertically positioning the work pallet. A bush fitted on the pallet is formed with an annular tapered surface capable of externally fitting tight on the tapered collet and of abutting tight with the receiving surface.

When the work pallet is positioned and fixed on the base body, the work pallet is attracted to the base body side and fixed by means of a clamp mechanism. In this case, the tapered collet is fitted tight between the sleeve shaft and the bush, and the work pallet is horizontally positioned against the base body, and the abutment surface of the bush comes in contact with the receiving surface, then the work pallet is positioned in a vertical direction as well.

On the other hand, in a work pallet positioning and fixing device disclosed in Japanese Laid-open Publication Hei No. 8-155770, a base body is provided with a tapered cone for horizontally positioning the work pallet and a receiving surface for vertically positioning the work pallet. Also, the work pallet is provided with a tapered socket externally fitted on the tapered cone, and the tapered socket is provided with an abutment surface for contacting with the receiving surface, and the inner periphery of the tapered cone is formed with an annular groove for promoting elastic deformation.

When the work pallet is positioned on the base body, the work pallet is attracted to the base body and fixed by means of a clamp mechanism. In this case, the tapered cone is slightly elastically deformed to reduce its diameter, and the tapered socket comes in tight contact with the tapered cone, causing the work pallet to be horizontally positioned, then the abutment surface at the work pallet side comes in contact with the receiving surface of the base body, causing the work pallet to be positioned in a vertical direction as well.

However, in a positioning and fixing device disclosed in Japanese Laid-open Publication No.2001-38564, the tapered collet is configured as a part separate from the sleeve shaft and is externally slidably fitted on the sleeve shaft, which is biased upward by the spring member and stopped by a stop ring. In such a structure, the number of parts is increased and the manufacturing cost becomes expensive, and also, if chips or the like generated during machining intrude around the tapered collet, it will cause worsening of vertical movement of the tapered collet or extreme lowering of the positioning performance.

On the other hand, the positioning and fixing device disclosed in Japanese Laid-open Publication Hei No. 8-155770 is configured so that the tapered cone is elastically deformed in a direction of diametrical reduction, but the tapered cone is formed of an annular wall which is continuously annular and relatively large in thickness, and therefore, the tapered cone is hard to be elastically deformed in the direction of diametrical reduction, and it is probably unable to assure positioning accuracy when positioning in both horizontal and vertical directions. Moreover, by increasing extremely the clamping force of the clamp mechanism, it will become possible to elastically deform the tapered cone in the direction of diametrical reduction, but it results in increase of the manufacturing costs for the clamp mechanism and its relating structures.

In addition, since the tapered cone is structured to be elastically deformed in the direction of diametrical reduction and is continuously annular in shape, the tapered cone will not be locally elastically deformed when the work pallet is positioned. For example, in a case where a plurality of positioning and fixing devices are disposed on the work pallet, the axial center of the annular tapered surface of tapered socket is often slightly deflected from the axial center of the tapered cone. In such a case, when a portion in the circumferential direction of the tapered cone is locally elastically deformed, the intended positioning function will be nearly obtained, but in a case where the tapered cone is not locally elastically deformed, it will be unable to obtain the intended positioning function and also the annular tapered surface of the tapered cone is liable to wear unevenly. The same holds true in the device disclosed in the previously mentioned Japanese Laid-open Publication No.2001-38564.

The object of the present invention is to provide a work pallet positioning and fixing device capable of positioning in both horizontal and vertical directions through elastic deformation of an annular engaging portion, a work pallet positioning and fixing device having an engaging portion which is elastically deformable along the entire periphery, and a work pallet positioning and fixing device having an engaging portion which is elastically deformable even locally in a circumferential direction.

DISCLOSURE OF THE INVENTION

The present invention presents a work pallet positioning and fixing device which is provided with a clamp mechanism for attracting and fixing a work pallet supporting a workpiece to be machined to a base body, and a positioning mechanism capable of positioning the work pallet with respect to the base body in each of horizontal and vertical directions.

And, above wherein the positioning mechanism comprises a receiving surface for defining a vertical position of the work pallet disposed on the base body, a sleeve shaft having an annular tapered surface for defining a horizontal position of the work pallet with respect to the base body, and an annular bush having an abutment surface for contacting with the receiving surface, which is disposed on the work pallet so as to be externally engagable with the sleeve shaft.

And, an inner periphery portion of the bush comprises an integrally formed engaging portion which is nearly annular and capable of elastically deforming in a diametrical direction, having an annular tapered surface at the inner periphery thereof, which is capable of externally fitting tight with the annular tapered surface, and an annular escape groove which allows an elastic deformation of the engaging portion is formed at an outer periphery side of the engaging portion of the bush.

When the work pallet is positioned on the base body, the work pallet is attracted and fixed to the base body by means of the clamp mechanism, and then the work pallet is accurately positioned by the positioning mechanism in each of horizontal and vertical directions against the base body.

In clamping operation, when the bush is externally fitted on the sleeve shaft, the annular tapered surface of the engaging portion of the bush engages with the annular tapered surface of the sleeve shaft.

When the work pallet is attracted to the base body by means of the clamp mechanism, the annular engaging portion is elastically deformed outwardly in the diametric direction and the diameter increases, and the annular tapered surface of the engaging portion comes in tight contact with the annular tapered surface of the sleeve shaft, then the work pallet is accurately positioned in the horizontal direction to the base body, causing the abutment surface of the bush to contact with the receiving surface of the base body, and thereby, the work pallet is accurately positioned in a vertical direction to the base body as well.

Since the engaging portion structurally has an external engagement to the sleeve shaft and an annular escape groove at its outer periphery side, the engaging portion is elastically deformable in the direction of diametrical expansion, and the abutment surface precisely contacts with the receiving surface. The engaging portion is formed integrally with the bush, and its function is not affected by chips or the like. Since the annular escape groove can be formed large enough relate to chips or the like, even when chips or the like get into the annular groove, it will not cause hindrance to the elastic deformation in the diametric direction of the engaging portion.

According to above work pallet positioning and fixing device, the following advantages can be obtained. Namely, when the bush is clamped on the base body, the engaging portion is precisely elastically deformed so that the annular tapered surface of the bush comes in tight contact with the annular tapered surface of the sleeve shaft, causing the abutment surface of the bush to contact tight with the receiving surface of the base body, and thereby, the work pallet can be accurately positioned in horizontal and vertical directions against the base body. Also, since the engaging portion is structurally liable to elastically deform, it is not necessary to increase the clamping force of the clamp mechanism for the purpose of elastic deformation of the engaging portion.

Also, the engaging portion is formed integrally with the bush, and the engaging portion does not move from the bush, and therefore, the positioning function of the engaging portion is not lowered due to chips or the like. Further, since an annular escape groove is formed at the outer periphery side of the engaging portion, the elastic deformation of the engaging portion can be promoted in a direction of diametrical expansion, and the annular escape groove can be formed radially large enough relative to chips or the like, thereby avoiding adverse effects that may otherwise caused due to chips or the like.

The present second invention presents a work pallet positioning and fixing device which is provided with a clamp mechanism for attracting and fixing a work pallet supporting a workpiece to be machined to a base body, and a positioning mechanism capable of positioning the work pallet with respect to the base body in each of horizontal and vertical directions.

And, above positioning mechanism comprises a receiving surface for defining a vertical position of the work pallet disposed on the base body, a sleeve shaft having an annular tapered surface for defining a horizontal position of the work pallet with respect to the base body, and an annular bush having an abutment surface for contacting with the receiving surface and an annular tapered surface capable of externally fitting tight with the annular tapered surface, which is disposed on the work pallet so as to be externally engagable with the sleeve shaft.

And, an outer periphery side of the sleeve shaft comprises an integrally formed engaging portion which is nearly annular and capable of elastically deforming in a diametrical direction, having the annular tapered surface at the outer periphery thereof, which is capable of internally fitting tight with the annular tapered surface of the bush, and an annular escape groove which allows elastic deformation of the engaging portion is formed at an inner periphery side of the engaging portion of the sleeve shaft.

The functions and advantages of this work pallet positioning and fixing device are basically same as those of the aforementioned device, and the differences will be described in the following. Since the engaging portion is formed integrally with the outer peripheral portion of the sleeve shaft, the function of the engaging portion is not affected by chips or the like. Also, the engaging portion is structurally subjected to elastic deformation in the direction of diametrical reduction due to the annular tapered surface of the bush, and therefore, it may be rather hard to be elastically deformed as compared with the engaging portion of the aforementioned device, but the intended elastic deformation can be obtained by lessening the thickness of the engaging portion as needed. Moreover, since an annular escape groove is formed at the inner periphery side of the engaging portion, the engaging portion can precisely elastically deform in a direction of diametrical reduction as same with the aforementioned device.

Further, the engaging portion may be provided with an elastic deformation promoting means for promoting the elastic deformation of the engaging portion. In this case, due to the elastic deformation promoting means, the engaging portion can elastically deform easily in the directions of both diametrical expansion and diametrical reduction, making it possible to elastically deform along the entire periphery and also possible to locally elastically deform in a circumferential direction. As a result, the engaging portion does not wear unevenly and durability can be improved.

The elastic deformation promoting means may be consistuted with a plurality of slits formed at equal intervals in the circumferential direction. Due to plural slits, the engaging portion can elastically deform in the directions of both diametrical expansion and diametrical reduction, making it possible to elastically deform along the entire periphery and also possible to locally elastically deform in a circumferential direction.

Otherwise, the elastic deformation promoting means can be constituted with a plurality of concave grooves formed alternately at the outer peripheral portion and inner peripheral portion of the engaging portion at equal intervals in a circumferential direction. Due to plural concave grooves, the engaging portion can elastically deform in the directions of both diametrical expansion and diametrical reduction, making it possible to elastically deform along the entire periphery and also possible to locally elastically deform in the circumferential direction.

DETAILED DESCRIPTION OF THE PREFERRED EMBODIMENT

The preferred embodiments of the present invention will be described in the following.

Figure 1:
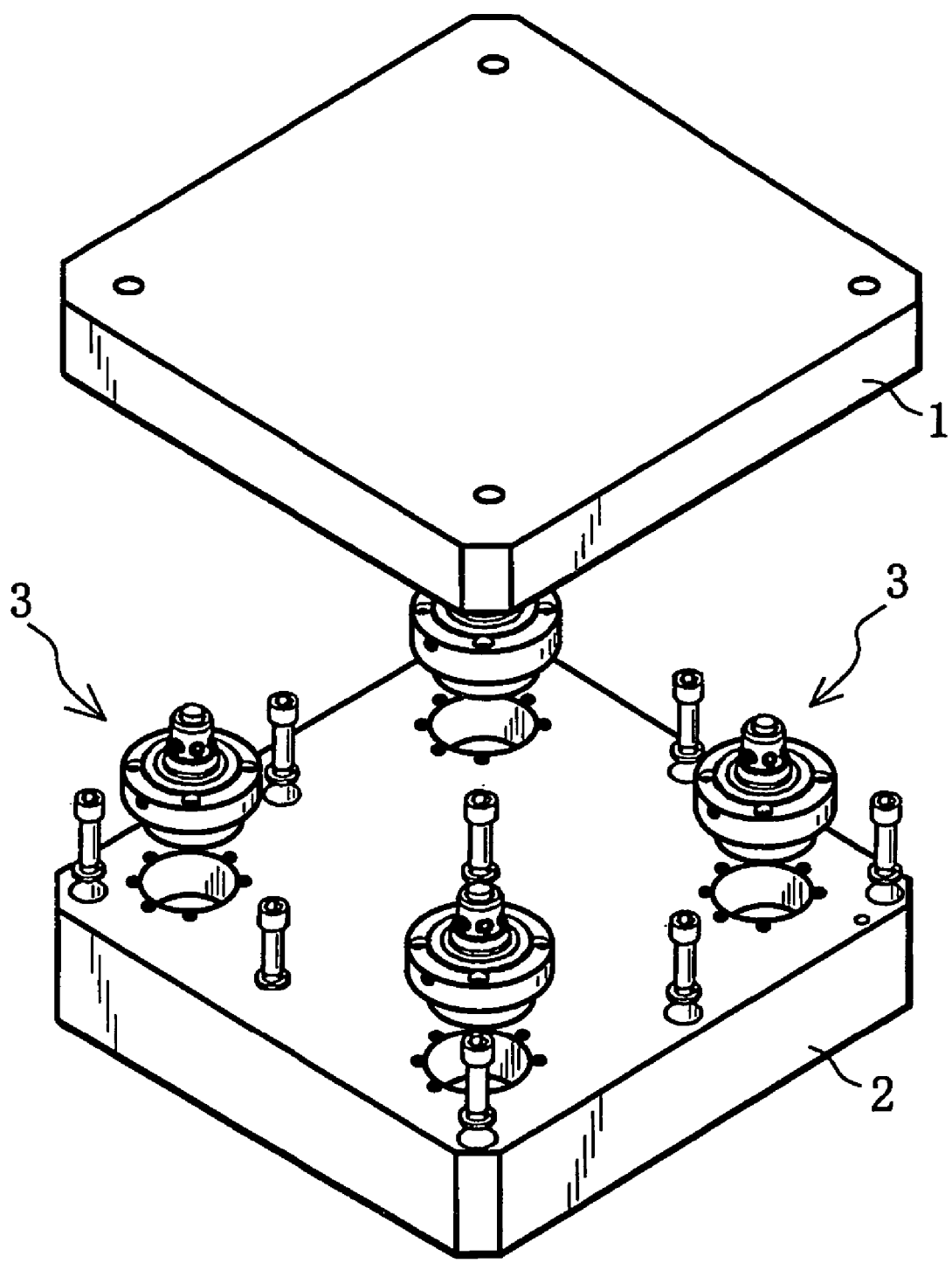
FIG. 1 is an overall view of a work pallet, base body and positioning and fixing device in the preferred embodiment of the present invention.

As shown in FIG. 1, work pallet 1 supporting a workpiece to be machined is positioned and fixed on base body 2 fixed on a machine tool table by means of four sets of work pallet positioning and fixing device 3. The work pallet 1 is like a nearly square thick plate, and the base body 2 is also like a square thick plate. The machine tool table itself is sometimes used as the base body. The four sets of positioning and fixing device 3 are arranged near the four corners of the work pallet 1 and base body 2.

Figure 2:
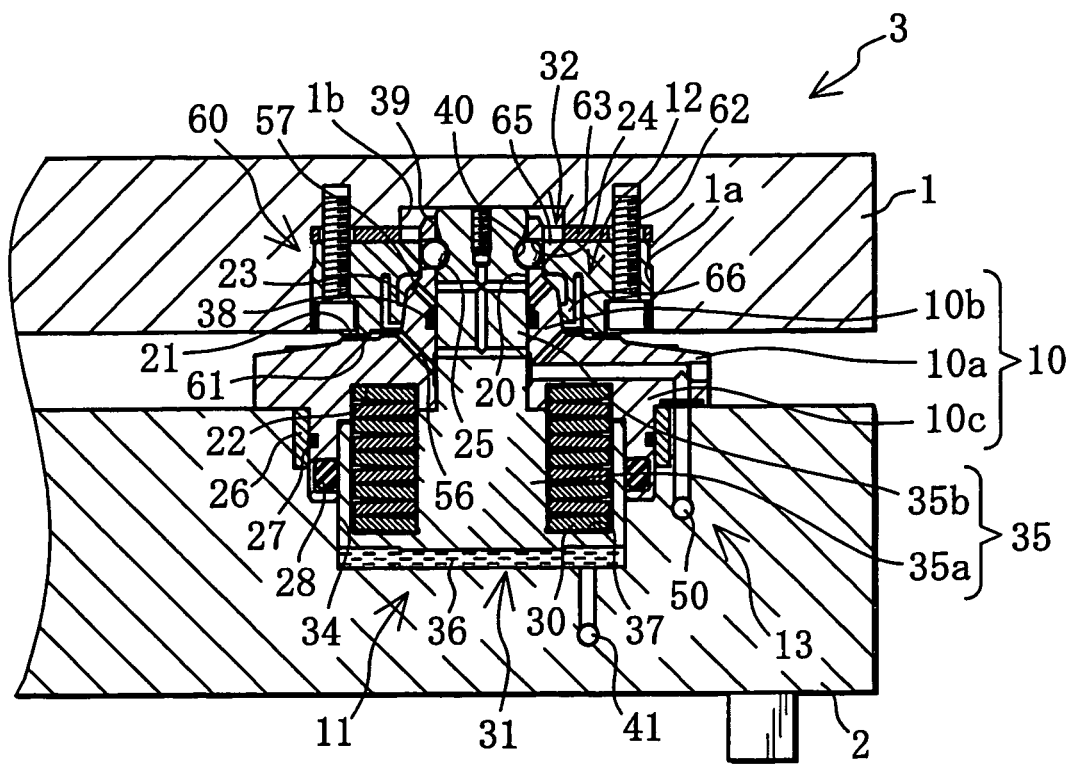
FIG. 2 is a sectional view of a positioning and fixing device (with clamp released).
Figure 3:
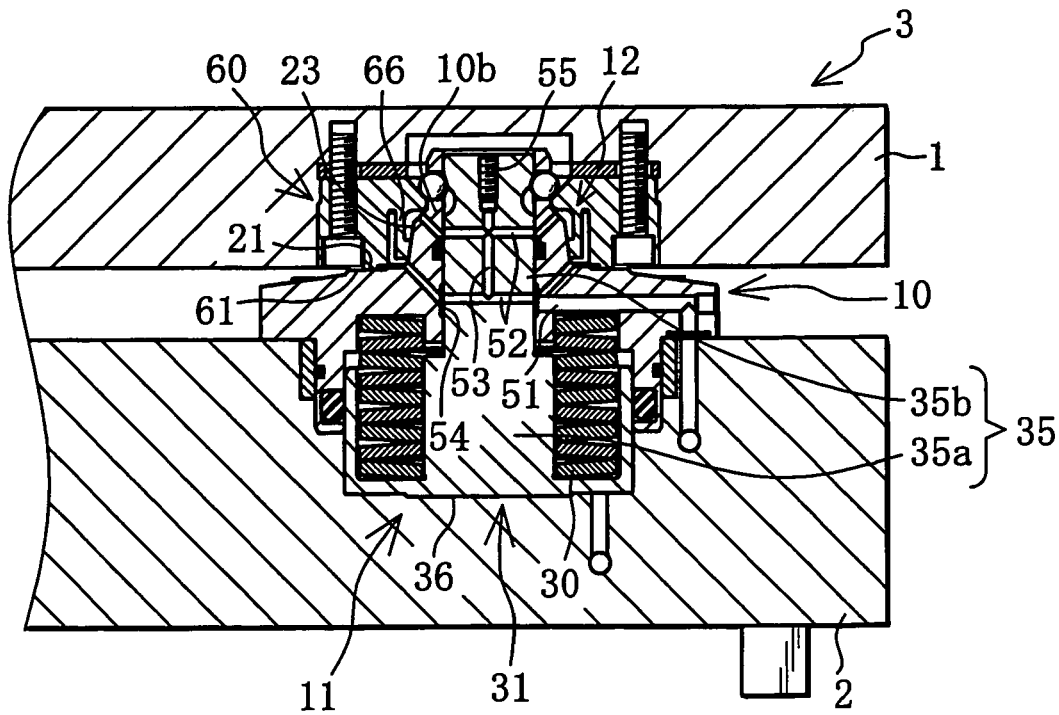
FIG. 3 is a sectional view of a positioning and fixing device (with clamp activated).

Next, the positioning and fixing device 3 will be described. Because the four sets of positioning and fixing device 3 are structurally identical with each other, one set of the positioning and fixing device 3 will be described hereinafter. As shown in FIG. 2 and FIG. 3, the positioning and fixing device 3 comprises a reference body 10 fixed on a base body 2 as a part of the base body 2, a clamp mechanism 11 for attracting and fixing the work pallet 1 to the base body 2, a positioning mechanism 12 capable of positioning the work pallet 1 in each of horizontal and vertical directions against the base body 2, and an air blower mechanism 13 for feeding dedusting pressure air.

The reference body 10 includes a large diameter portion 10a at a vertical middle portion, a sleeve shaft 10b extended upward from the large diameter portion 10a, and an annular portion 10c protruded from the bottom end of the large diameter portion 10a.

The reference body 10 is secured on the base body 2 with a plurality of bolts through the large diameter portion 10a in a state that the annular portion 10c is internally fitted in storing hole 2a of the base body 2. The reference body 10 is provided with rod inserting hole 20 in which a piston rod 35b of clamp mechanism 11 is inserted.

On the upper surface of the large diameter portion 10a formed is an annular receiving surface 21 for receiving the work pallet 1 and defining the vertical position of the work pallet 1, and on the lower surface of the large diameter portion 10a formed is an annular spring storing portion 22 storing a part of a plurality of coned disc springs 30 of the clamp mechanism 11. At the outer peripheral surface of the lower portion of sleeve shaft 10b formed is an annular tapered surface 23 having a diameter decreasing toward upper side. The annular tapered surface 23 is for horizontal positioning by externally fitting the bush 60 of the positioning mechanism 12. The annular portion 10c of the reference body 10 is furnished with a sleeve member 26 and a seal member 27. Cylinder hole 34 of hydraulic cylinder 31 is formed in the annular portion 10c and the base body 2, and a seal member 28 is fitted on the annular portion 10c.

The clamp mechanism 11 comprises a piston member 35 as an output member for outputting clamping forces and clamp releasing forces, a plurality of coned disc springs 30 generating clamping forces, hydraulic cylinder 31 generating clamp releasing force directing upward, and a clamp engaging mechanism 32 which makes the piston member 35 engage with the bush 60. The piston member 35 includes a piston 35a and the piston rod 35b.

The spring group including a plurality of coned disc springs 30 for generating clamping forces is arranged in compressed state in the annular portion 10c and piston 35a, and a few of springs 30 is stored in the spring storing portion 22 of large diameter portion 10a, while the rest of springs 30 is stored in annular spring storing portion 37 of the piston 35a. The spring group generates the clamping force to powerfully drive the piston member 35 downward.

The hydraulic cylinder 31 comprises cylinder hole 34 in which the piston portion 35a is housed vertically movably, piston member 35, and oil chamber 36 for vertically driving the piston member 35. The rod 35b can vertically slide in the rod inserting hole 20, and the gap between the rod 35b and the rod inserting hole 20 is sealed with the seal member 38. Inside the base, the oil chamber 36 is arranged under the piston 35a, and the pressurized oil in the oil chamber 36 is supplied to and discharged from oil passage 41 connected to an external pressurized oil feeding device.

Next, the clamp engaging mechanism 32 will be described. At the upper end of the rod 35b formed is an annular projection 39, and at the lower part of the annular projection 39 formed is an annular recess 40. At the upper part of the sleeve shaft 10b, there is provided a plurality (for example, six) of through-holes 24 radially piercing through the sleeve shaft 10b, and steel balls 25 are respectively retained in these through-holes 24 movably.

In clamping operation, the oil pressure is released from the oil chamber 36, and the rod 35b is moved downward by downward clamping force. Then, the steel balls 25 are pushed outward by the annular projection 39 of rod 35b, to engage with the tapered engaging surface 65 of bush 60, and the clamping force is transmitted from the rod 35b to the bush 60, causing the work pallet 1 to be securely fixed on the base body 2. When the oil pressure is supplied into the oil chamber 36 in clamp releasing operation, the piston member 35 is moved upward by the oil pressure, then the annular recess 40 of the rod 35b comes to a position facing the plural steel balls 25, and these steel balls 25 move inward to disengage from the tapered engaging surface 65, thereby causing the work pallet 1 to be released.

As shown in FIG. 2 and FIG. 3, the air blower mechanism 13 blows air to dissipate chips or the like from the outer surface of the sleeve shaft 10b and the inner surface of the bush 60 when the work pallet 1 is carried in and fixed on the base body 2. The air blower mechanism 13 includes an air passage 50 in the base body 2 which is connected to an external pressurized air feeding device, an air passage 51 in the reference member 10, air passages 52, 53 in the rod 35b, an annular groove 54, and blow holes 56, 57. The air passage 52 is formed radially in four lines for example, while the blow holes 56, 57 are also formed radially in four lines for example, and the upper end of the air passage 53 is closed with a plug member 55.

Next, the positioning mechanism 12 will be described. As shown in FIG. 2 to FIG. 5, the positioning mechanism 12 comprises a receiving surface 21 of the reference body 10, the sleeve shaft 10b with annular tapered surface 23, and an annular bush 60 fixed in the work pallet 1 so as to be externally engagable with the sleeve shaft 10b. The bush 60 is circularly annular in plane view and is internally fitted in the storing hole 1a formed at the lower part of the work pallet 1, and with the height adjusted via shim plate 63 for height adjustment, the bush is fixed to the work pallet 1 for example with four bolts 62. Also, the work pallet 1 is provided with recess 1b connected to the upper end of the storing hole 1a.

At the lower end of the bush 60, there is formed an annular abutment surface 61 for vertical positioning which comes in contact with the receiving surface 21, and the center of bush 60 has a central hole 64 for inserting the sleeve shaft 10b. At the upper end portion of the bush 60, there is formed a tapered engaging surface 65 inclined at about 45 degrees with decreasing its diameter downward, which is located outside the central hole 64. At the inner periphery portion of the lower half of the bush 60, there is integrally provided a nearly annular engaging portion 66 cepable of deforming radially elastically, and at the inner periphery of the engaging portion 66 formed is an annular tapered surface 67 that can contact tight with the annular tapered surface 23.

Figure 4:
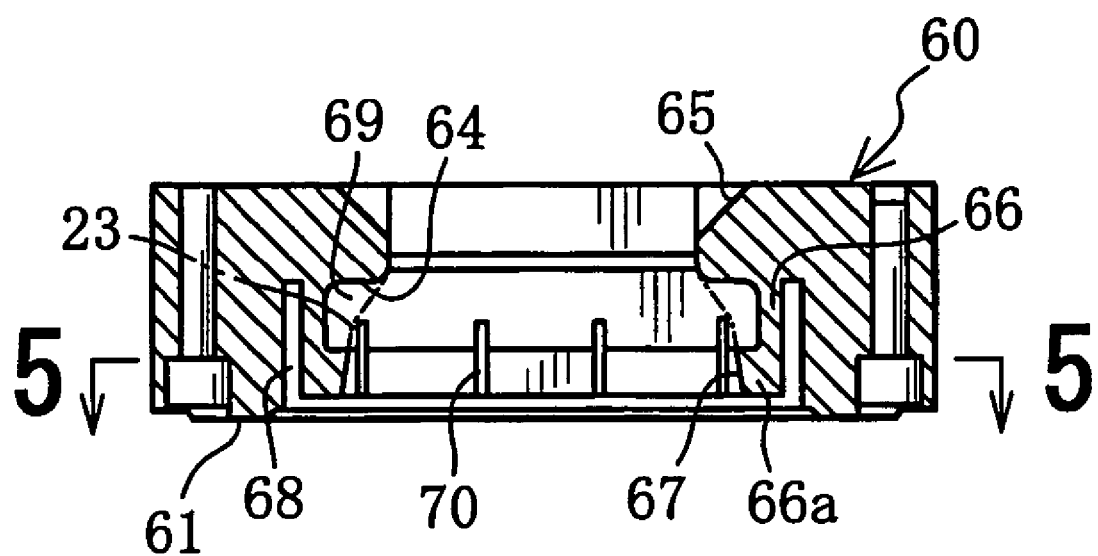
FIG. 4 is a sectional view of a bush.
Figure 5:
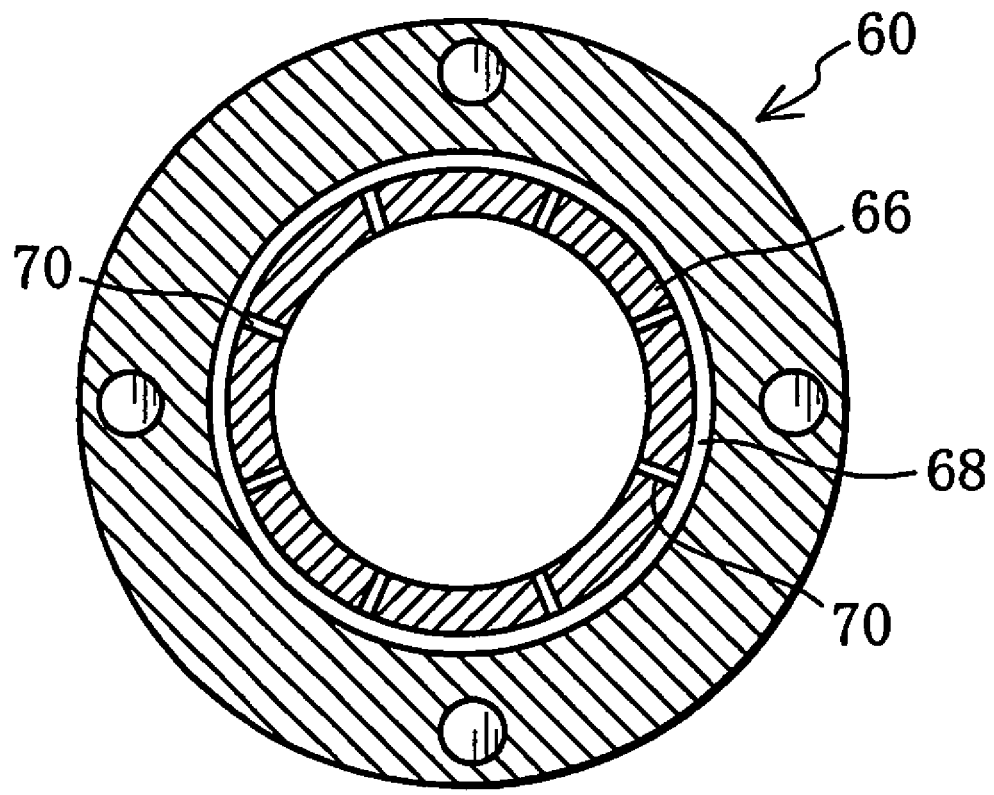
FIG. 5 is a sectional view along the V—V line of FIG. 4.

As shown in FIG. 4 and FIG. 5, the engaging portion 66 has a sleeve outer periphery, and at the inner periphery side of the upper half of the engaging portion 66 formed is an annular concave groove 69 for promoting the elastic deformation of the engaging portion 66, and on the inner periphery of engaging main body 66a of the lower half of the engaging portion 66 formed is an annular tapered surface 67 that is externally engagable tight with the annular tapered surface 23 of the sleeve shaft 10b. The lower end of the engaging portion 66 is positioned slightly higher than the lower end of the bush 60. At the outer periphery side of the engaging portion 66, there is formed an annular escape groove 68 that allows the engaging portion 66 to elastically deform diametrically outward. The width (thickness) of annular escape groove 68 is about 3 to 5 mm in diametric direction so as to prevent the annular escape groove 68 from being clogged with chips or the like.

As shown in FIG. 4 and FIG. 5, the engaging portion 66 is provided for example with eight slits 70 with lower ends open at circumferentially equal intervals as an elastic deformation promoting means which promotes the elastic deformation of the engaging portion 66. The circumferential width of the slit 70 is preferably about 1 to 2 mm. In the case of engaging portion 66 shown in FIG. 4, the slit 70 is formed along the entire height of the engaging portion 66. It is possible to form the slit 70 only within the range of engaging main body 66a or only in the lower half of the engaging portion 66.

The number of slits 70 and their circumferential width are not limited to those above mentioned. The engaging portion 66 is required to have appropriate rigidity at least in the horizontal direction in order to perform accurate horizontal positioning of the work pallet 1. The wall thickness in the radial direction of the engaging portion 66 is properly determined in relation with the material of bush 60, the height and number of slits 70, and the clamping force of clamp mechanism 11. However, when the clamping force is strong enough, the horizontal frictional force between the receiving surface 21 and the abutment surface 61 is large enough, it is not necessary for the engaging portion 66 to support a strong machining force in the horizontal direction because most of the horizontal machining force from cutting tool to work pallet 1 during machining may be supported by above frictional force.

The operation of the positioning and fixing device 3 will be described in the following.

As shown in FIG. 2, when the work pallet 1 is loaded and fixed on the base body 2, pressurized oil is supplied to the oil chamber 36 to keep the clamp mechanism released. In this case, as the clamp releasing force due to the oil pressure pushes up the piston member 35 against the clamping force of the coned disc spring group 30, the upper end of rod 36b comes in contact with the upper end of recess 1b. Then, the steel ball 25 is partially stored in the annular recess 40, thereby the steel balls 25 disengage from the tapered engaging surface 65 of the bush 60. In this condition, the annular tapered surface 67 of the bush 60 is not completely in contact with the annular tapered surface 23 of the sleeve shaft 10b, and the engaging portion 66 is not radially elastically deformed, and the abutment surface 61 is not in contact with the receiving surface 21. When the work pallet 1 is loaded, the pressure air for air blower mechanism 13 is supplied, and the work pallet 1 is positioned and fixed while blowing air from a plurality of blow holes 56, 57.

Next, as shown in FIG. 3, when the oil pressure of the oil chamber 36 is released in order to position and fix the work pallet 1, the piston member 35 moves downward by the strong downward clamping force of the coned disc spring group 30. In this case, the plurality of steel balls 25 are outwardly pushed by the annular projection 39 of the rod 35b and are driven to engage with the tapered engaging surface 65 of the bush 60, then the clamping force is transmitted from the bush 60 to the work pallet 1, thereby fixing the work pallet 1 on the base body 2.

Then, the engaging portion 66 of the bush 60 is externally fitted on the sleeve shaft 10b, and the engaging portion 66 is elastically deformed radially outward, causing the annular tapered surfaces 23, 67 to come in contact with each other and the abutment surface 61 to come in contact with the receiving surface 21. As the annular tapered surfaces 23, 67 contact with each other, the work pallet 1 is horizontally accurately positioned, and also, as the abutment surface 61 contacts with the receiving surface 21, the work pallet 1 is vertically accurately positioned.

In that case, when the engaging portion 66 is externally fitted on the sleeve shaft 10b as described above, the elastic deformation of the engaging portion 66 is promoted because of the plural slits 70 formed in the engaging portion 66, and therefore the elastic deformation of the engaging portion 66 is precisely allowed due to the annular escape groove 68 at the outer periphery side of the engaging portion 66, making it possible to deform elastically easily. Accordingly, by lowering of the work pallet 1, the engaging portion 66 elastically deforms diametrically outward so as to expand in diameter at the annular tapered surface 23, then the annular tapered surface 67 comes in contact with the annular tapered surface 23, and the abutment surface 61 comes in contact with the receiving surface 21, and in this condition, the engaging portion 66 is fixed on the base body 2 by the clamping force of the clamp mechanism 11.

Moreover, since plural slits 70 are formed in the engaging portion 66, the engaging portion 66 can deform locally and elastically, and the following operation can also be obtained. That is, there are provided four sets of positioning and fixing device 3 disposed on the work pallet 1, but due to errors in manufacturing of the work pallet 1 and bush 60, at any one of the positioning and fixing devices 3, if the axial center of the engaging portion 66 of the bush 60 is slightly deflected in a horizontal direction from the axial center of the sleeve shaft 10b, then the engaging portion 66 does not deform elastically and uniformly over the entire periphery, but a part of the engaging portion 66 deforms circumferentially and elastically, and thus, positioning of the work pallet 1 is executed while absorbing the errors. Consequently, the engaging portion 66 hardly wears unevenly and durability will be improved.

The positioning and fixing device 3 as described above will bring about the following advantages.

Since the engaging portion 66 is formed integrally with the bush 60, the manufacturing accuracy of the annular tapered surface 67 at the bush 60 can be increased, and the operation of the engaging portion 66 is not affected by chips or the like, and the number of parts is less, thereby manufacturing cost can be decreased.

Since the annular escape groove 68 is provided at the outer periphery side of the engaging portion 66, the engaging portion 66 can deform easily outward, facilitating the elastic deformation of the engaging portion 66. Since plural slits 70 as elastic deformation promoting means are provided in the engaging portion 66, it is possible to promote deformation of the engaging portion 66 and to promote uniform deformation along the entire periphery. But, also, partial elastic deformation in a circumferential direction is allowed. Accordingly, the positioning performance of the work pallet 1 can be improved, the uneven wear and durability of the engaging portion are improved.

Since the annular escape groove 68 is formed large enough to prevent clogging of chips or the like, the elastic deformation of the engaging portion 66 is not affected even when chips or the like get into the groove.

Various modifications of the preferred embodiment will be described in the following. Those structurally same as above preferred embodiment are given same reference numerals, and the descriptions are omitted.

Figure 6:
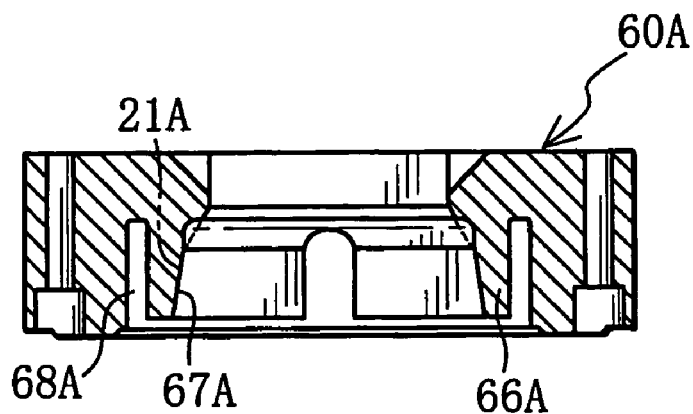
FIG. 6 is a FIG. 4 equivalent of a modification.
Figure 7:
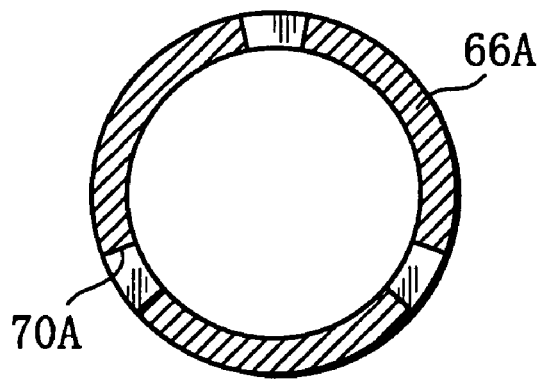
FIG. 7 is a FIG. 5 equivalent of a modification.
Figure 8:
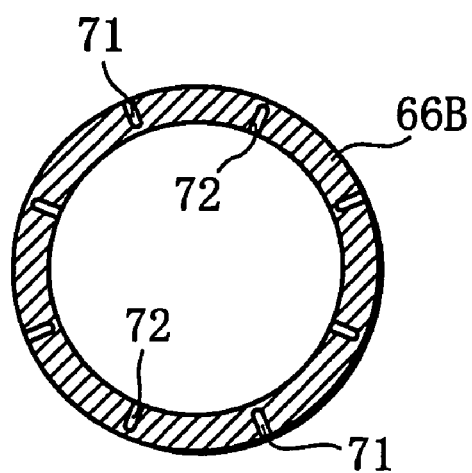
FIG. 8 is a FIG. 5 equivalent of a modification.

1) Various structures can be adopted instead of above engaging portion. For example, as shown in FIG. 6, and FIG. 7, it is preferable to form engaging portion 66A of bush 60A so that the annular tapered surface 67A of engaging portion 66A may come in contact with the entire surface of annular tapered surface 21A of sleeve shaft 10b and to form annular escape groove 68A at the outer periphery side of the engaging portion 66A. Also, as an elastic deformation promoting means for promoting the elastic deformation of the engaging portion 66A, as shown in FIG. 7, it is preferable to form a plurality (for example, three) of wide slits 70A at circumferentially equal intervals extending from the lower end to upper end of the engaging portion 66A. Further, as shown in FIG. 8, it is preferable to form a plurality (for example, four) of concave grooves 71, 72 extending from the lower end to upper end of engaging portion 66B at each of the outer periphery and the inner periphery of the engaging portion 66B and to provide these vertical grooves 71, 72 alternately at circumferentially equal intervals.

Figure 9:
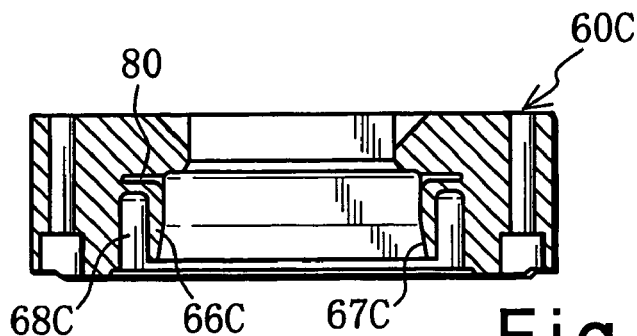
FIG. 9 is a FIG. 4 equivalent of a modification.
Figure 10:
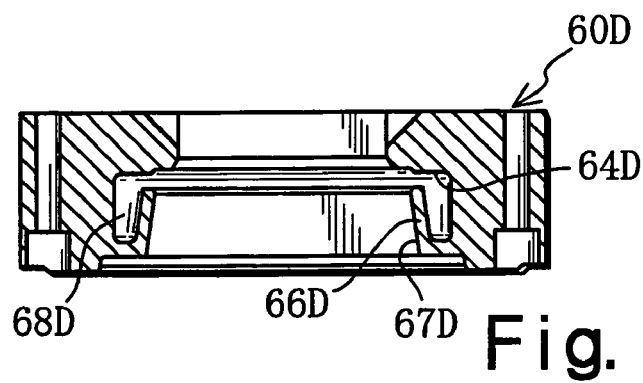
FIG. 10 is a FIG. 4 equivalent of a modification.
Figure 11:
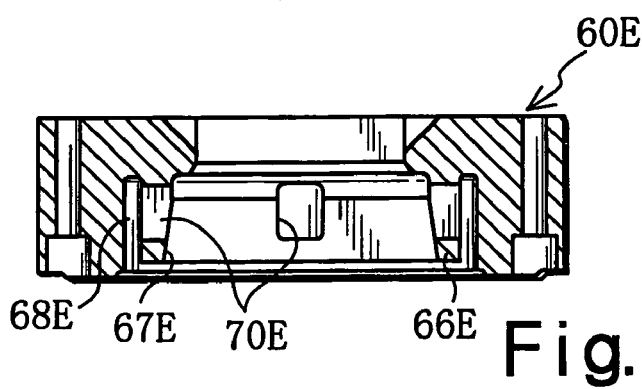
FIG. 11 is a FIG. 4 equivalent of a modification.
Figure 12:
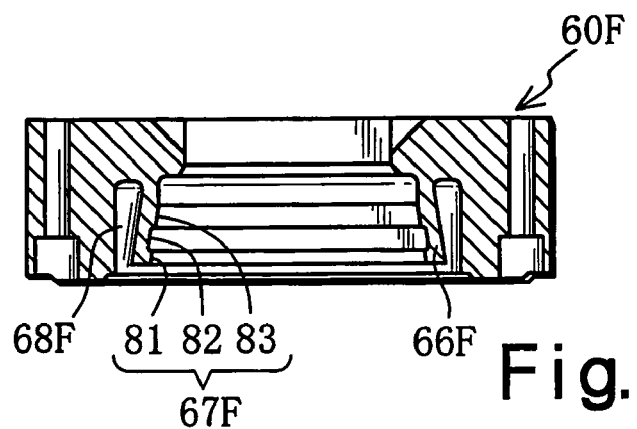
FIG. 12 is a FIG. 4 equivalent of a modification.

Also, as shown in FIG. 9, at the bush 60C, it is preferable to form an annular escape groove 68C at the outer side of engaging portion 66C with annular tapered surface 67C and also to form horizontal annular slit 80 at the upper side of the engaging portion 66C. As shown in FIG. 10, at the inner periphery portion of bush 60D, it is preferable to form an engaging portion 66D with annular tapered surface 67D so as to extend upward from the lower end of central hole 64D and to form annular escape groove 68D at the outer periphery side of the engaging portion 66D. Further, as shown in FIG. 11, at bush 60E, it is preferable to dispose an engaging portion 66E with annular tapered surface 67E, and annular escape groove 68E, and to form a plurality (for example, four) of openings 70E radially piercing through the engaging portion 66E at circumferentially equal intervals. Further, as shown in FIG. 12, at bush 60F, it is preferable to form an annular escape groove 68F at the outer periphery side of the engaging portion 66F and also to configure annular tapered surface 67F having, for example, three different tapered surfaces 81, 82, 83.

That is, as an engaging portion, various structures can be employed, provided that an annular escape groove formed at the outer periphery side of the engaging portion allows radial elastic deformation, allowing the diametrical expansion and reduction thereof. And the engaging portion may be provided with elastic deformation promoting means of various shapes.

Figure 13:
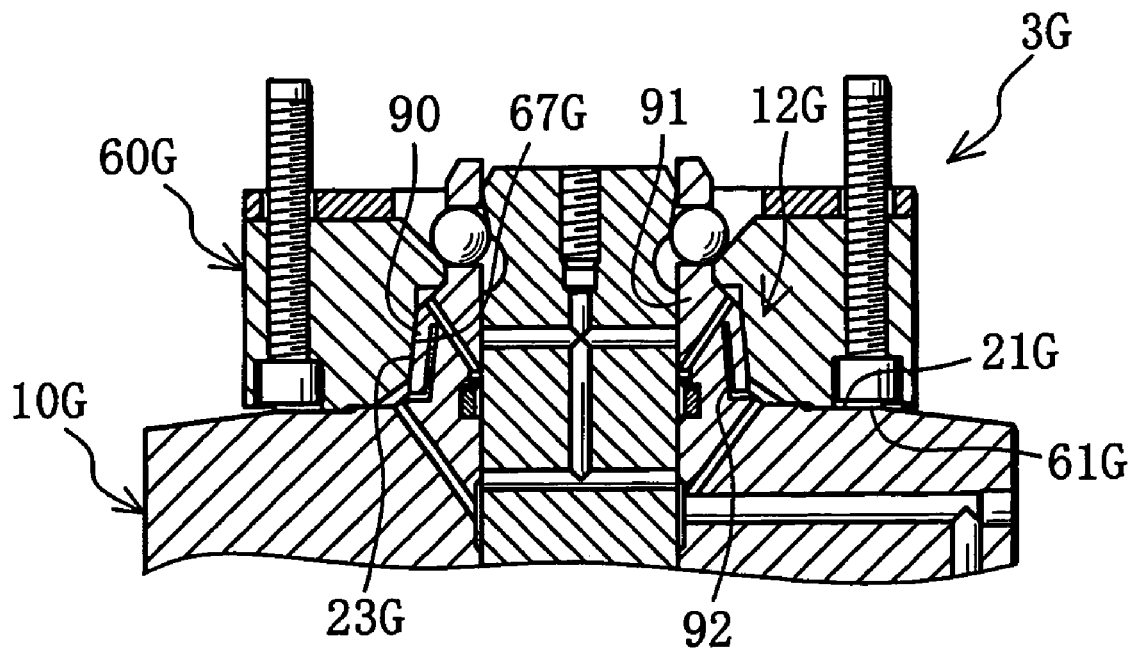
FIG. 13 is a sectional view of a positioning and fixing device of a modification.

2) As shown in FIG. 13, it is preferable to form an engaging portion 90 deformable elastically in a radial direction at the base body 2. That is, the positioning mechanism 12G of positioning and fixing device 3G comprises a receiving surface 21G for vertically positioning the work pallet 1 disposed on the base body 2, a sleeve shaft 91 with annular tapered surface 23G for horizontally positioning the work pallet 1 against the base body 2, and an annular bush 60G disposed on the work pallet 1 so as to be externally attachable to the sleeve shaft 91 and provided with an annular tapered surface 67G that may contact tight with the annular tapered surface 23G and with an abutment 61G for abutting on the receiving surface 21G.

Figure 14:
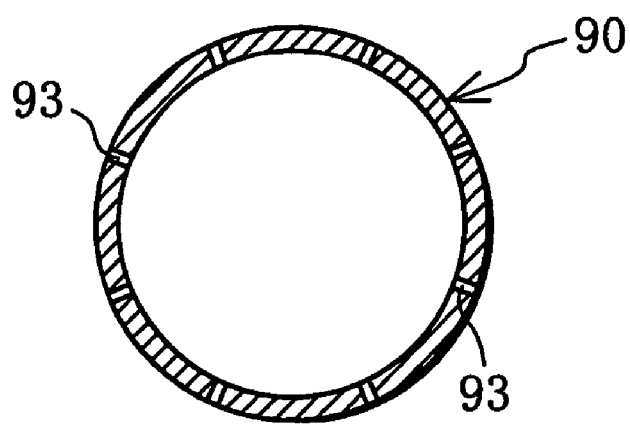
FIG. 14 is a sectional plan view of an engaging portion of a modification.

At the outer periphery side of the sleeve shaft 91 of reference body 10G, there is integrally formed the engaging portion 90 which is internally engagable in tight contact with the annular tapered surface 67G of bush 60G, including the annular tapered surface 23G at the outer periphery and extending from the upper end toward the lower end of the sleeve shaft 91 the nearly annular engaging portion 90 is capable of radial elastic deformation. At the inner periphery side of the engaging portion 90 in the sleeve shaft 91 formed is an annular escape groove 92 for allowing the elastic deformation of the engaging portion 90. As shown in FIG. 14, at the engaging portion 90, eight slits 93 are formed at circumferentially equal intervals, extending from the lower end to nearly upper end of the engaging portion 90. Due to these slits 93, the radial elastic deformation of the engaging portion 90 is promoted, enabling easier diametrical expansion of the engaging portion 90.

Next, operation of the positioning and fixing device 3G will be described. Since the engaging portion 90 is allowed to elastically deform in a direction of diametrical reduction due to annular escape groove 92, and further the eight slits 93 promote the elastic deformation, the engaging portion 90 can deform easily elastically in a direction of diametrical reduction. Accordingly, in clamping operation, the work pallet 1 is fixed while the engaging portion 90 being elastically deformed in the direction of diametrical reduction, keeping the annular tapered surface 23G of the engaging portion 90 in a state of being in tight contact with the annular tapered surface 67G of the bush 60G, and thereby, the work pallet 1 is accurately positioned in the horizontal direction. At the same time, the abutment surface 61G of the bush 60G abuts with the receiving surface 21G, and the work pallet 1 is accurately positioned in the vertical direction as well. Accordingly, by using the positioning and fixing device 3G, it is possible to obtain nearly same advantages as in the preferred embodiment.

Figure 15:
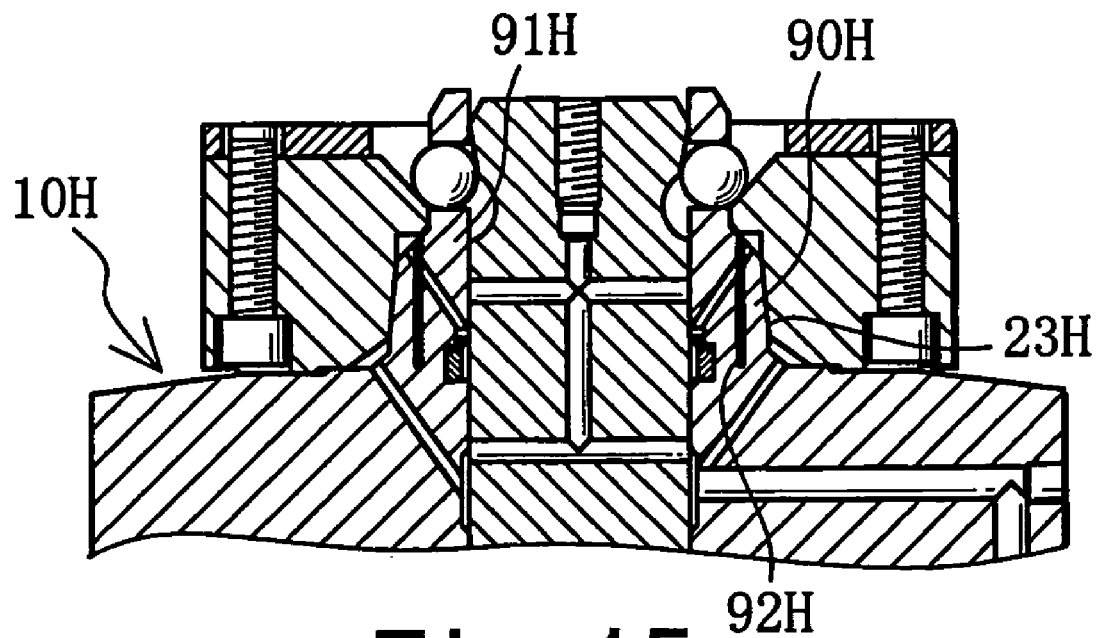
FIG. 15 is a sectional side view of a positioning and fixing device of a modification.
Figure 16:
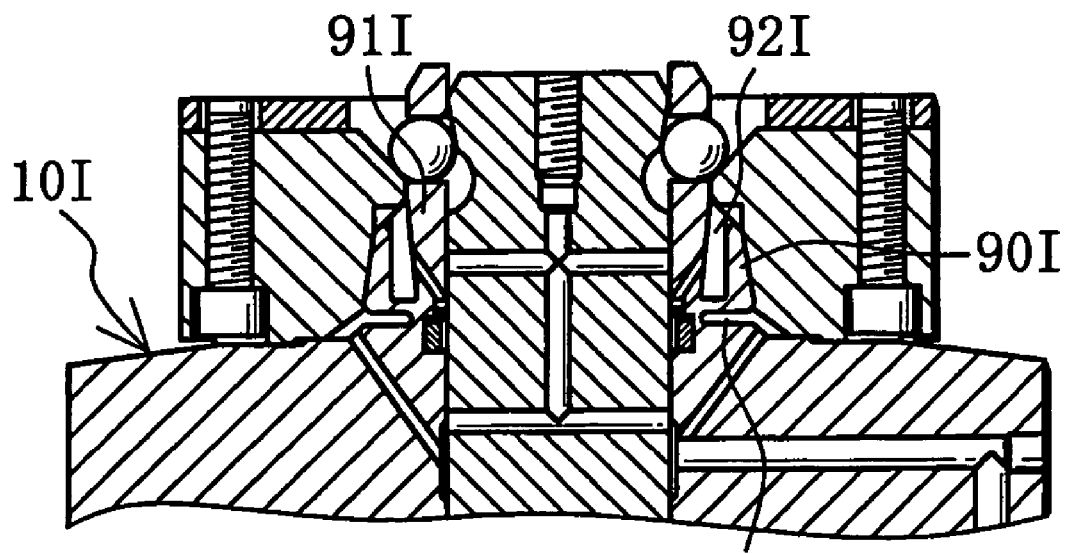
FIG. 16 is a sectional side view of a positioning and fixing device of a modification.

Also, as shown in FIG. 15, it is preferable to integrally form an engaging portion 90H having annular tapered surface 23H so as to extend upward from the lower end of sleeve shaft 91H of large diameter portion 10H and to form an annular escape groove 92H at the inner periphery side of the engaging portion 90H. Also, as shown in FIG. 16, at large diameter portion 10I, it is preferable to form an annular escape groove 92I at the inner periphery side of the engaging portion 90I of sleeve shaft 91I and also to form an annular horizontal slit 94 at the bottom of the engaging portion 90I. Further, as elastic deformation promoting means for promoting the elastic deformation of the engaging portion, those of various shapes can be employed as same as aforementioned cases of forming the engaging portion at the work pallet 1 side.

3) Clamp mechanism 11 for attracting and fixing the work pallet 1 to the base body 2 can be configured so that the clamping force and clamp releasing force are generated by an oil pressure cylinder or a fluid pressure cylinder which is activated with fluid pressures such as nitrogen gas and the like. Further, clamp engaging mechanism 32 can be configured so that the work pallet 1 is fixed on the base body 2 by pulling down a pull-stud disposed on the work pallet 1 by means of a driving means provided at the side of the base body 2. Namely, it is possible to employ various types of well-known clamp mechanisms.

4) It is not always to provide four sets of positioning and fixing device 3 for positioning the work pallet 1 to the base body 2, but it is preferable to position and fix the work pallet 1 by using at least three sets of positioning and fixing device 3. Also, it is not always to apply the present invention to all the positioning and fixing devices 3 for positioning the work pallet 1. For example, it is preferable to apply the present invention to two positioning and fixing devices 3 in positions diagonal to each other, while executing only vertical positioning of the work pallet 1 by the other positioning and fixing devices.

What is claimed is:

1. A work pallet positioning and fixing device which is provided with a clamp mechanism for attracting and fixing a work pallet supporting a workpiece to be machined to a base body, and a positioning mechanism capable of positioning said work pallet with respect to said base body in each of horizontal and vertical directions, wherein said positioning mechanism comprises a receiving surface for defining a vertical position of said work pallet disposed on said base body, a sleeve shaft having an annular tapered surface for defining a horizontal position of said work pallet with respect to said base body, and an annular bush having an abutment surface for contacting with said receiving surface, which is disposed on said work pallet so as to be externally engagable with said sleeve shaft, and an inner periphery portion of said bush comprises an integrally formed engaging portion which is nearly annular and capable of elastically deforming in a diametrical direction, having an annular tapered surface at the inner periphery thereof, which is capable of externally fitting tight with said annular tapered surface, and an annular escape groove which allows an elastic deformation of said engaging portion is formed at an outer periphery side of said engaging portion of said bush.

2. A work pallet positioning and fixing device which is provided with a clamp mechanism for attracting and fixing a work pallet supporting a workpiece to be machined to a base body, and a positioning mechanism capable of positioning said work pallet with respect to said base body in each of horizontal and vertical directions, wherein said positioning mechanism comprises a receiving surface for defining a vertical position of said work pallet disposed on said base body, a sleeve shaft having an annular tapered surface for defining a horizontal position of said work pallet with respect to said base body, and an annular bush having an abutment surface for contacting with said receiving surface and an annular tapered surface capable of externally fitting tight with said annular tapered surface, which is disposed on said work pallet so as to be externally engagable with said sleeve shaft, and an outer periphery side of said sleeve shaft comprises an integrally formed engaging portion which is nearly annular and capable of elastically deforming in a diametrical direction, having said annular tapered surface at the outer periphery thereof, which is capable of internally fitting tight with said annular tapered surface of said bush, and an annular escape groove which allows elastic deformation of the engaging portion is formed at an inner periphery side of said engaging portion of said sleeve shaft.

3. The work pallet positioning and fixing device of claim 1 or claim 2, wherein said engaging portion is provided with an elastic deformation promoting means for promoting elastic deformation of said engaging portion.

4. The work pallet positioning and fixing device according to claim 3, wherein said elastic deformation promoting means comprises a plurality of slits formed at circumferentially equal intervals.

5. The work pallet positioning and fixing device according to claim 3, wherein said elastic deformation promoting means comprises a plurality of concave grooves formed alternately at the outer periphery portion and the inner periphery portion of said engaging portion, at circumferentially equal intervals.

* * * * *